May 22, 1934.   V. A. SCHOENBERG   1,960,226
TORSION METER
Filed July 31, 1933
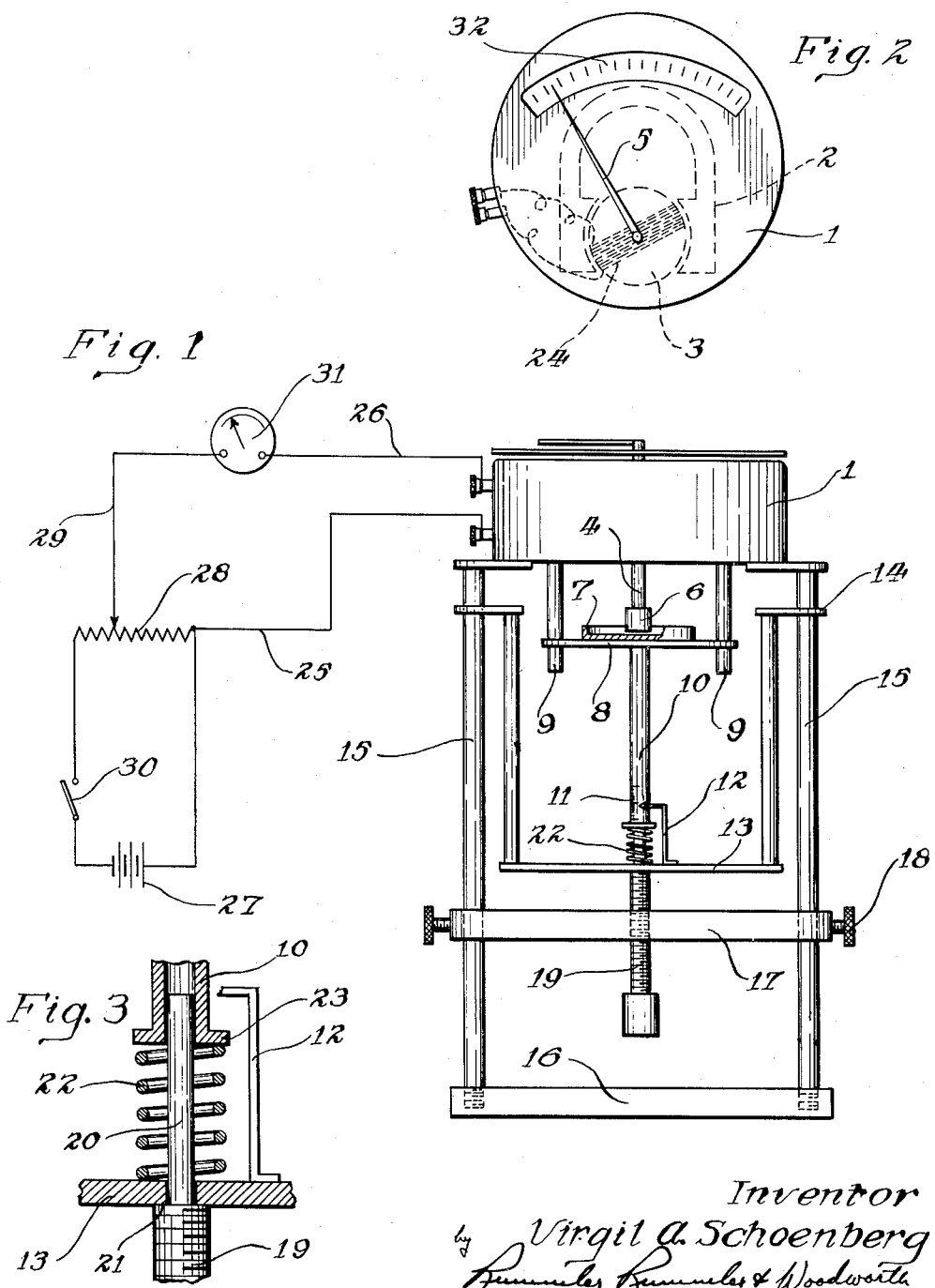

Patented May 22, 1934

1,960,226

UNITED STATES PATENT OFFICE 1,960,226

TORSION METER

Virgil A. Schoenberg, Niles Center, Ill.

Application July 31, 1933, Serial No. 682,993

3 Claims. (Cl. 265—11)

This invention relates to an instrument for determining the resistance, tackiness or stickiness of a lubricant or other liquids such as adhesives or syrups.

The purpose of the invention is to provide for giving an exact reading or indication of the static torsion characteristics of a liquid. By static torsion characteristics of a liquid is meant the inherent qualities of the liquid which cause it to resist shearing, twisting or rolling between bearing surfaces or the combined value of the cohesion between molecules of the liquid and the adhesion of the liquid to bearing surfaces. The instrument is for measuring static resistance of the molecular forces in the test specimen. Static friction is of higher value than sliding or rolling friction and by making a measurement of such static resistance qualities of a lubricating oil or grease may be more definitely ascertained than is possible when the contacting surfaces are in rapid, relative motion or under high pressure when the factors of heat and speed enter into the problem. For example, in rating lubricants with reference to their inherent resistance to shear or the rolling of the molecules thereof one upon the other, the comparative value of various lubricants in this regard may be quickly ascertained by means of the instrument herein described.

The instrument is operated according to the method of this invention to indicate torsional resistance values of liquids directly in electrical units or equivalents thereof in grams or other units of measurement.

In the drawing, Figure 1 shows in side elevation and partly in section, an instrument suitable for carrying out the purposes of this invention. This view also includes a diagrammatic showing of cooperating electrical devices and the circuit connections thereof.

Fig. 2 is a plan view of the indicator, and

Fig. 3 is an enlarged sectional detail showing means for bringing about a definite pressure between the surface of a liquid under test and a friction means for gripping the surface of the liquid.

For indicating torsion characteristics of a liquid, a special electrical instrument is so constructed to have a shaft extending therefrom, which shaft carries at its outer end a circular liquid contact button of predetermined area. A small quantity or film of the liquid under test is carried by a dish-shaped holder. This holder is moved upwardly to contact the liquid with the button. A resilient shifting means for the dish is arranged to indicate exactly the contact pressure. The shaft of the torsion indicating instrument is operated by an armature, the winding of which is connected in series with an ammeter and source of electro motive force. The ammeter serves to indicate the condition of the circuit throughout the test. The ammeter should read zero when contact is made with the film of liquid to be tested. A potentiometer is then operated to gradually energize the armature of the torsion indicator to the extent required to overcome the frictional resistance of the film of liquid. The ammeter needle moves according to the adjustment of the potentiometer and indicates the electrical energy flowing through the circuit, but the torsion armature remains at zero setting until the electrical energy is sufficient to overcome the resistance of the liquid under test.

The potentiometer is allowed to rest in its set position when the torsion instrument needle starts to move, and the strength of the electrical energy required to effect a shearing action of the liquid is then read on the ammeter in series with the torsion instrument. The unit of marking of the ammeter dial is preferably in accordance with arbitrary torsion standards.

The dial of the torsion instrument is divided into various divisions for the observance of the rate of acceleration of the torsion armature, which is controlled by the potentiometer and checked audibly by means of a metronome, sufficient electrical energy being supplied to cause an even rate of motion between divisions as checked with the metronome, so as to permit all tests to be conducted at the same rate, and when accomplished, the potentiometer is allowed to rest in its set position and the strength of the electrical energy required is then read on the calibrated ammeter.

In the accompanying illustration of the invention, 1 represents the torsion indicator. The magnetic field of this instrument is provided for by the permanent magnet 2 between the poles of which is an armature 3 which may oscillate within bearings provided by the instrument casing and has a shaft 4 which carries at its upper end the indicating needle 5 and at its lower end a contact element 6 for engaging a film or drop of oil which is placed in a dish 7. This dish is supported by the shelf 8 which may be guided vertically along the guide rods 9 extending from the instrument casing. A central tube 10 extending downwardly from shelf 8 is used for lifting and lowering the shelf and for indicating by the markings 11 the pressure between the contact element 6 and the surface of the liquid in the dish. The pointer 12 moves relatively to the markings 11 only after the button 6 has contacted with the liquid, and serves to measure on the scale the pressure of the contact. This is provided for by mounting the pointer on a vertically shiftable U-shaped frame 13. This frame has apertured ears 14 through which pass guide rods 15 extending between the instrument casing 1 and supporting base 16. The casing of the instrument 1, rods 15, base 16 constitute the frame structure of the device. Extending between the rods 15 is a bar 17 which is clamped to rods 15 by the set screws 18. Threaded into the bar 17 is an adjusting screw 19, the upper end of which is reduced in diameter as indicated at 20, Fig. 3, to provide a shoulder 21 upon which rests the sliding frame 13.

A spring 22 surrounds the reduced end of the adjusting screw and rests upon the frame 13 and supports tube 10 and the sliding shelf 8 rigid with the tube. The tube is flanged at 23 to provide a seat for the spring. When the adjusting screw 19 is operated, frame 13, spring 22, tube 10 and shelf 8 may move up and down as a unit, but when button 6 contacts with the liquid to be tested, further upward adjustment of frame 13 causes some compression of spring 22 and results in the pointer 12 moving upwardly relatively to tube 10 and indicating on scale 11 the extent of compression of spring 22 or the pressure of the liquid against the button 6.

In order to turn the armature 3, and thus produce a twisting or torsional effect on the liquid in contact with button 6, the armature coil 24 is connected through the conductors 25 and 26 to opposite sides of a battery 27. A potentiometer coil 28 is bridged between the conductors 25 and 26, and the latter includes a shiftable contact element 29. When the switch 30 is closed and the potentiometer arm 29 is in the zero position at the right end of coil 28, no current flows through the coil 24 of the torsion indicator, and ammeter 31 indicates zero. By shifting arm 29 away from its zero position, coil 24 becomes energized, and while ammeter 31 indicates the current flow, the armature 3 does not move until the coil 24 is sufficiently energized to rock the armature against the resistance of the liquid under test. Then needle 5 moves from its zero position and the electrical energy required is then read on the calibrated ammeter 31 marked in arbitrary units of torsion, which will show the number of units required to cause the oil or liquid film to shear between the torque button face and the preferably glazed surface of dish 7.

By lowering the adjusting screw 19, the tube 10, shelf 8 and dish 7 may be quickly removed from the guide rods 9 to facilitate cleaning.

In the use of the construction after a small quantity of liquid has been placed in dish 8 and the latter is adjusted upwardly by screw 19 until pointer 12 indicates the desired pressure on the liquid, switch 30 is closed and the potentiometer contact arm 29 is placed in such a position that ammeter 31 indicates zero. Then arm 29 is shifted, permitting current to flow through coil 24 of the torsion indicator 1. Movement of arm 29 is stopped at the time of a sudden jump of pointer 5. The ammeter 31 will then indicate the value of units required to frictionally shear the liquid under test.

Although but one specific embodiment of this invention is herein shown and described, it will be understood that details of the construction shown may be altered or omitted without departing from this invention as defined by the following claims.

I claim:

1. An instrument for measuring resistance required to shear off a liquid which consists of a support for the liquid, a liquid contacting element, means for uniformly positioning said contacting element relative to said liquid support as regards spacing and pressure, electromagnetic means for moving the contact element relatively to the support over the surface of the support for the purpose of shearing the liquid between the contacting element and the support, a circuit for said electromagnetic means including a source of electromotive force and a variable resistance for regulating the current flow through said electromagnetic means from zero value gradually upward, and means for indicating the power required for effecting the necessary relative movement between the contacting member and liquid support for shearing a liquid between said contacting member and said support.

2. An instrument for measuring resistance required to shear off a liquid which consists of a support for the liquid, a liquid contacting element, means for uniformly positioning said contacting element relative to said liquid support as regards spacing and pressure, electromagnetic means for moving the contact element relative to the support over the surface of the support for the purpose of shearing the liquid between the contacting element and the support, means for indicating movement of said contact element, a circuit for said electromagnetic means including a source of electromotive force and a variable resistance for regulating the current flow through said electromagnetic means from zero value gradually upward, and means for indicating the power required for effecting the necessary relative movement between the contacting member and liquid support for shearing a liquid between said contacting member and said support.

3. An instrument of the class described, comprising a frame, a liquid container, a movable support for said container, guides for restricting movement of said support to that in a vertical direction, a sleeve depending from said support, a shouldered screw threaded into said frame and inserted into said sleeve, a spring interposed between the shoulder on said screw and the lower end of said sleeve, calibrated means to indicate the degree of compression of said spring, an electrical torque producing means carried by said frame, a member operatively connected to said torque producing means in a position to entrap a film of liquid between its lower end and said container, a potentiometer circuit for energizing said torque producing means including means for indicating the amount of torque produced thereby.

VIRGIL A. SCHOENBERG.